US008170343B2

(12) United States Patent
Chien

(10) Patent No.: US 8,170,343 B2
(45) Date of Patent: May 1, 2012

(54) METHOD AND SYSTEM FOR SEARCHING IMAGES WITH FIGURES AND RECORDING MEDIUM STORING METADATA OF IMAGE

(75) Inventor: Yi-Tsung Chien, Yilan County (TW)

(73) Assignee: Corel Corporation, Ottawa (CA)

( * ) Notice: Subject to any disclaimer, the term of this patent is extended or adjusted under 35 U.S.C. 154(b) by 1244 days.

(21) Appl. No.: 11/849,294

(22) Filed: Sep. 2, 2007

(65) Prior Publication Data

US 2008/0317353 A1 Dec. 25, 2008

(30) Foreign Application Priority Data

Jun. 25, 2007 (CN) .......................... 2007 1 0128062

(51) Int. Cl.
G06K 9/46 (2006.01)

(52) U.S. Cl. ......................... 382/194; 382/209; 382/157

(58) Field of Classification Search .................. 382/117, 382/118; 340/5.53, 5.83
See application file for complete search history.

(56) References Cited

U.S. PATENT DOCUMENTS

| 4,975,728 | A | * | 12/1990 | Gordon | 355/1 |
| 5,751,286 | A | | 5/1998 | Barber et al. | |
| 6,035,055 | A | * | 3/2000 | Wang et al. | 382/118 |
| 6,243,501 | B1 | * | 6/2001 | Jamali | 382/305 |
| 6,373,979 | B1 | * | 4/2002 | Wang | 382/165 |
| 6,504,571 | B1 | | 1/2003 | Narayanaswami et al. | |
| 6,801,657 | B1 | * | 10/2004 | Cieplinski | 382/164 |
| 6,907,141 | B1 | | 6/2005 | Okamoto | |
| 6,907,147 | B2 | | 6/2005 | Crafts et al. | |
| 6,934,410 | B1 | * | 8/2005 | Aleshin et al. | 382/144 |
| 6,970,859 | B1 | | 11/2005 | Brechner et al. | |
| 7,030,885 | B2 | * | 4/2006 | Kim et al. | 345/589 |
| 7,035,462 | B2 | * | 4/2006 | White et al. | 382/167 |
| 7,062,083 | B2 | * | 6/2006 | Lim et al. | 382/164 |
| 7,197,166 | B2 | * | 3/2007 | Jeng | 382/118 |
| 7,298,907 | B2 | * | 11/2007 | Hasegawa | 382/209 |
| 7,356,179 | B2 | * | 4/2008 | Young | 382/164 |
| 7,492,926 | B2 | * | 2/2009 | Kang | 382/117 |
| 7,574,049 | B2 | * | 8/2009 | Bober | 382/203 |
| 7,804,982 | B2 | * | 9/2010 | Howard et al. | 382/115 |
| 7,876,934 | B2 | * | 1/2011 | Georgescu et al. | 382/128 |

(Continued)

OTHER PUBLICATIONS

Pantic et al. "Web-Based Database for Facial Expression Analysis" IEEE (2005) pp. 1-5.*

(Continued)

Primary Examiner — Jason M Repko
Assistant Examiner — Mia M Thomas
(74) Attorney, Agent, or Firm — Mark J. Danielson; Pillsbury Winthrop Shaw Pittman LLP

(57) ABSTRACT

A method and a system for searching images with figures and a recording medium storing metadata of image are provided. The searching method is divided into an image analysis stage and an image search stage. In the image analysis stage, figures between images are compared with each other and assigned with an identity respectively. A representative image of each identity is then evaluated from the image collection. In the image search stage, the representative images are displayed for user to select some of them as a searching criterion, so as to search and display the images matching the searching criterion in the image collection. Accordingly, the images required by user can be found through intelligent analysis of figures, intuitive definition of searching criterion, and simple comparison of identities so that both time and effort of organization for searching images with figures can be substantially saved.

26 Claims, 8 Drawing Sheets

U.S. PATENT DOCUMENTS

| | | | |
|---|---|---|---|
| 7,916,903 B2* | 3/2011 | Eura et al. | 382/118 |
| 7,933,507 B2* | 4/2011 | Jelinek et al. | 396/18 |
| 2002/0133489 A1 | 9/2002 | Kim et al. | |
| 2002/0181745 A1* | 12/2002 | Hu | 382/107 |
| 2003/0112357 A1 | 6/2003 | Anderson | |
| 2004/0041924 A1* | 3/2004 | White et al. | 348/239 |
| 2004/0135904 A1 | 7/2004 | Shiota et al. | |
| 2004/0146187 A1* | 7/2004 | Jeng | 382/117 |
| 2005/0175237 A1* | 8/2005 | Young | 382/164 |
| 2006/0139709 A1 | 6/2006 | Bifano et al. | |
| 2006/0280497 A1 | 12/2006 | Wakabayashi | |
| 2007/0019842 A1* | 1/2007 | Kang | 382/117 |
| 2009/0016577 A1* | 1/2009 | Mino et al. | 382/118 |
| 2009/0043824 A1* | 2/2009 | Claghorn | 707/200 |
| 2009/0169067 A1* | 7/2009 | Chang et al. | 382/118 |
| 2009/0256852 A1* | 10/2009 | Sakurai et al. | 345/557 |
| 2010/0080452 A1* | 4/2010 | Nagano et al. | 382/159 |
| 2010/0202703 A1* | 8/2010 | Jeon et al. | 382/209 |
| 2010/0295860 A1* | 11/2010 | Somerville et al. | 345/545 |
| 2010/0315215 A1* | 12/2010 | Yuda | 340/435 |

OTHER PUBLICATIONS

Suh et al. "Semi-automatic Image Annotation using Event and Torso Identification" (2004) pp. 1-4.*

Wang et al. "Design of a Meta Model for integrating enterprise systems" Computers in Industry 56 (2005) pahes 305-322 (1-18).*

Griffoen et al. "Automatic and Dynamic Identification of Metadata in Multimedia" (1998) pp. 1-14.*

Cui et al. "Easy Album: An Interactive Photo Annotation System Based on Face Clustering and Re-Ranking" CHI 2007 Proceedings*Photo Sharing, Apr. 2007 San Jose, CA pp. 1-10.*

* cited by examiner (a)

(b)

| | RANDOM NUMBER | | FIGURE IDENTITY |
|---|---|---|---|
| FACIAL CHARACTERISTIC | FACE REGION | FACE RATIO | NUMBER OF FIGURES |
| DRESS CHARACTERISTIC | DRESS REGION | | DRESS COLOR |
| HAIR CHARACTERISTIC | HAIR REGION | | HAIR COLOR |
| BACKGROUND CHARACTERISTIC | BACKGROUND REGION | | BACKGROUND COLOR |

METHOD AND SYSTEM FOR SEARCHING IMAGES WITH FIGURES AND RECORDING MEDIUM STORING METADATA OF IMAGE

CROSS-REFERENCE TO RELATED APPLICATION

This application claims the priority benefit of China application serial no. 200710128062.0, filed Jun. 25, 2007. All disclosure of the China application is incorporated herein by reference.

BACKGROUND OF THE INVENTION

1. Field of the Invention

The present invention generally relates to a method and a system for searching images, in particular, to a method and a system for automatically searching images based on the identities or characteristics of figures.

2. Description of Related Art

Taking a picture has become very easy along with the widespread of digital cameras, and correspondingly, the number of pictures has been increasing dramatically. Accordingly, how to effectively manage a large number of pictures has become a major subject to users. Usually, when one wants to look for a picture from a large number of picture files, he/she has to recall the date on which the picture may be taken and browse through some folders in which the picture may be stored. If the pictures of a particular person are desired, these pictures could be found out according to the titles of the picture files and should be opened to check figures one by one, which is very time-consuming and troublesome.

A lot of picture management software has been provided to resolve foregoing problem, and they can be categorized into two types. In the first type of picture management software, a tag is added to each picture, wherein the tag records the related information of the picture such as date, place, equipment, event, or attendees. While searching for a picture, the picture is located by issuing a searching criterion such as the category, style, or attributes of the picture file. A method for searching and sorting media clips having associated style and attributes is disclosed in U.S. Pat. No. 6,970,859. FIG. 1 illustrates a media searching interface corresponding to the method. Referring to FIG. 1, a style identifier is associated with each media clip stored in a database based on a subjective evaluation of various characteristics of the media clip by an expert. While searching for a media file, a user can browse or search for the media file in the database based on a selected category, keyword, or style. However, in the method described above, all the pictures have to be tagged by the user manually, and every user has a different aspect about the content of the pictures. Thereby, foregoing method is too complicated and inefficient.

In the other type of picture management software, a desired picture is selected by directly comparing the low level characteristics of the picture, such as the colors and shapes of objects in the picture. An image query system and a method thereof are disclosed in U.S. Pat. No. 5,751,286. FIG. 2 illustrates a corresponding interface of the image query system. Referring to FIG. 2, images are searched in an image database according to the visual characteristics, such as colors, textures, shapes, and sizes, of the images. A user can give some example images for the invention to find images having similar visual characteristics as examples in the image database. However, in the case of searching for images of a particular person, low level characteristics have very weak relationship with human appearance. Therefore, user would take a lot of time looking for the image one by one from many undesired results. Thereby, the method described above is still not satisfactory.

SUMMARY OF THE INVENTION

Accordingly, the present invention is directed to a method for searching images with figures, wherein images of a particular figure are searched by comparing the characteristics of figures in an image collection, so that both the time and effort for searching images with figures are reduced.

The present invention is directed to a system for searching images with figures, wherein every figure in a plurality of images of an image collection is compared with each other and assigned with an identify respectively by an image analysis engine, so that the images matching a searching criterion defined in an image searching interface can be located quickly.

The present invention provides a method for searching images with figures, wherein the method is suitable for searching a plurality of images related to at least one figure in an image collection. The method can be divided into an image analysis stage and an image search stage. In the image analysis stage, figures in the images are assigned with identities respectively. Representative image of each identity is then evaluated from the image collection. In the image search stage, representative images are displayed and some of them are selected by user as a searching criterion. Next, images matching the searching criterion in the image collection are eventually displayed.

According to an embodiment of the present invention, the step of assigning an identity to each of the figures in the images further includes following steps. First, characteristic regions of each figure are located in the image, and regional characteristics of the figure are then extracted from each characteristic region. Finally, the regional characteristics of every figure in different images are compared with each other and those figures having the same regional characteristics are assigned with the same identity. In an embodiment of the present invention, first, one of a plurality of characteristic regions such as face region is detected and other characteristic regions are located according to the face region. After that, features of the characteristic regions are extracted as characteristics of the figure. Finally, characteristics of every figure in different images are compared with each other, and the figures having the same characteristics are assigned with the same identity. The aforementioned characteristic region of a figure includes one of a face region, a dress region, a hair region, and a background region.

According to an embodiment of the present invention, the step of assigning an identity to each of the figures further includes following steps. There is an ambiguity of identity if figures in a plurality of image groups have been respectively assigned with identities. To solve this problem, first characteristics of an identity in some images of an image group are extracted. Next, the characteristics of each identity between the image groups are compared with each other, and those identities having the same characteristics are unified into the same labels.

According to an embodiment of the present invention, the step of evaluating a representative image of each identity from the image collection includes following steps. A representative index of the figure in each image is calculated respectively, and the image having the largest representative index is selected as the representative image of the identity in the image collection. The representative index includes one of the size of the characteristic region of a figure, the size of a image group which an image belongs to, and the capture time of an image.

According to an embodiment of the present invention, the method for assigning an identity to a figure of an image includes recording the identity into a metadata corresponding to the image, wherein the metadata may be stored in a header file of the image or in an external file corresponding to the image.

According to an embodiment of the present invention, the step of displaying the representative images further includes following steps. First, the representative images are sorted according to a relationship index of corresponding identity, and are sequentially displayed, wherein the relationship index includes one of the average size of the characteristic region of an identity, the number of appearance, and the capture time of an image.

According to an embodiment of the present invention, the step of selecting some of the representative images as a searching criterion includes following steps. First, the representative images specified by user are collected and then are translated into corresponding identities which would be used as a comparison criterion for searching.

According to an embodiment of the present invention, the step of displaying the images matching the searching criterion includes following steps. First, the identities of every image are compared with that of searching criterion to collect images having the identities specified by user. These images are then sorted according to the number of figures in the image or the size of characteristic region of an identity in the criterion, and are sequentially displayed.

The present invention further provides a system for searching images with figures, wherein the system includes an image analysis engine and an image searching interface. The image analysis engine further includes an identity analysis module and a representative image evaluation module, and the image searching interface includes a searching criterion definition module, a search module, and a display module. The identity analysis module compares characteristics of figures in the collection and assigns an identity to each of the figures respectively. The representative image evaluation module respectively selects a representative image from the image collection for each identity. The searching criterion definition module collects one or some of the selected representative images to a searching criterion. The search module searches for images matching the searching criterion in the image collection. The display module displays the representative images and those images matching the searching criterion.

The present invention further provides a computer-readable recording medium for storing a metadata of an image. The metadata contains facial characteristic data and regional characteristic data, wherein the facial characteristic data records the characteristic and facial data of figures in the image, and the regional characteristic data records the characteristics and data of other characteristic regions except the face region of the figure in the image.

According to an embodiment of the present invention, the metadata further contains an identification data which records identities of figures in the corresponding image and a serial number to detect ambiguity of identity.

According to an embodiment of the present invention, the facial characteristic data includes the face region of the figure in the image, the size of the face region, the characteristic of the face region, or the number of figures in the image.

According to an embodiment of the present invention, the characteristic region includes one of a dress region, a hair region, and a background region, and the regional characteristic data includes the characteristic region and the regional characteristic of the characteristic region.

In the present invention, figures appeared in a plurality of images are analyzed and identities of the figures are recorded in metadata of the images, so that the images matching a searching criterion can be quickly found by directly comparing the identities stored in the metadata. Accordingly, the process for searching images with figures is simplified, and both the time and effort of a user for searching images are reduced.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
FIG. 1 illustrates a conventional media searching interface.

Reference will now be made in detail to the present preferred embodiments of the invention, examples of which are illustrated in the accompanying drawings. Wherever possible, the same reference numbers are used in the drawings and the description to refer to the same or like parts.

It can be observed from personal life pictures that some figures appear very frequently and the more closed their relationship is, the more popular they are in the pictures. Those figures are usually major objects in the search of pictures with figures. Accordingly, in the present invention, figures in the pictures are analyzed and respectively assigned with a specific identity. While searching for pictures of figures, a simple searching criterion is defined and the desired pictures of identities can be accurately located through identity comparison, which is very convenient and fast. Below, embodiments of the present invention will be described in detail with reference to accompanying drawings.

Figure 3:
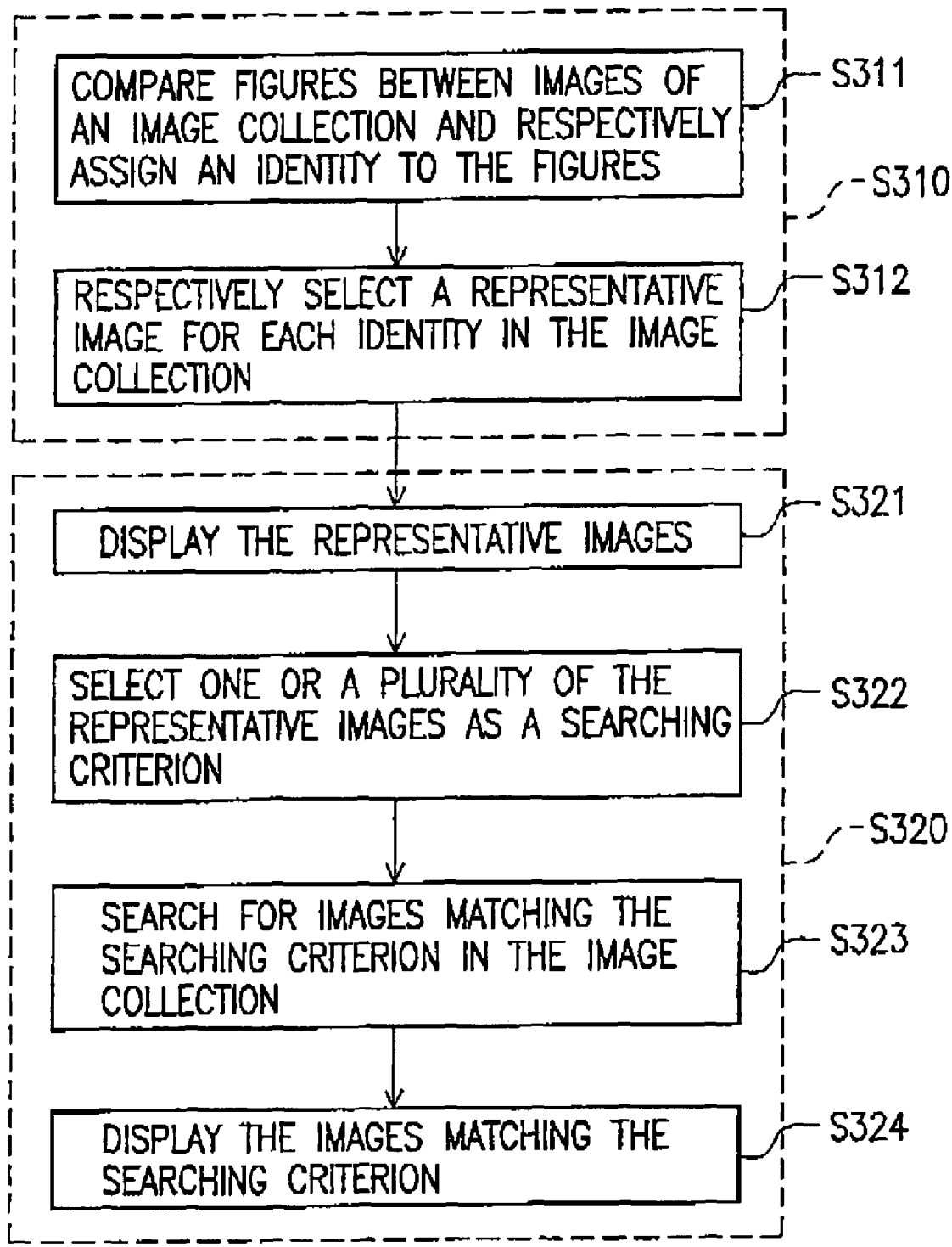
FIG. 3 is a flowchart illustrating a method for searching images with figures according to an embodiment of the present invention.

FIG. 3 is a flowchart illustrating a method for searching images with figures according to an embodiment of the present invention. Referring to FIG. 3, in the present embodiment, images containing some particular figures are searched in an image collection and provided to a user. The image collection contains a plurality of images, and these images include various images such as people, landscapes, animals, and vehicles. In the present embodiment, the image search method is divided into an image analysis stage and an image search stage, which will be respectively described below.

In the image analysis stage (step S310), first, a plurality of figures in the image collection are compared with each other and the same figures are assigned with an identity (step S311). In this step, figures between images are matched with each other according to the characteristics, such as the face, dress, and hair etc., of the figure by image recognition technology. To be specific, in this step, a face region of each figure is located in an image, and facial characteristics of the figure are extracted from the face region. The facial characteristics of an figure in one image are compared with that in other images and those figures having the same facial characteristics are considered as the same identity. Finally, the specific identity of a figure is recorded for the images containing the same figure. The adopted identity match technique may use elastic bunch graph matching (EBGM) or correlation of local binary patterns (LBP) or Fisherface etc.

Additionally, in the present embodiment, besides comparing the facial characteristics, regions of other characteristics, such as dress, hair, and background, are further located according to the face region, and a regional characteristic (for example, color occupying the largest area) of each of the characteristic regions is respectively extracted. By comparing the representative colors of figures between images, figures having the same representative colors are selected and considered as the same identity. Eventually, an identity is assigned to those images containing this figure.

Figure 4:
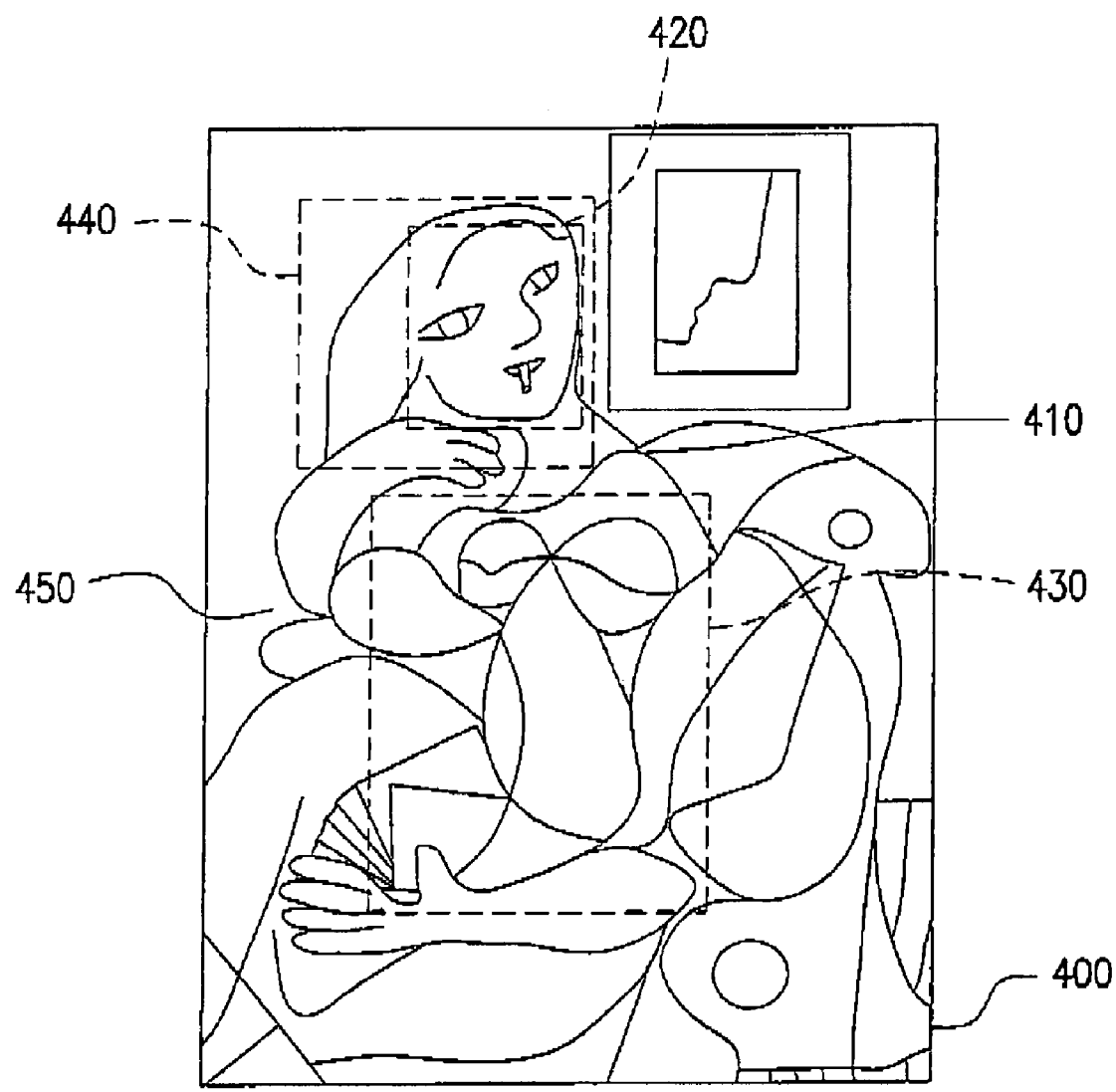
FIG. 4 illustrates a face region and a plurality of characteristic regions in an image according to an embodiment of the present invention.

FIG. 4 illustrates a face region and a plurality of characteristic regions in an image according to an embodiment of the present invention. Referring to FIG. 4, image 400 shows a lady 410 sitting in a sofa. A face region 420 is located in the image 400 by an image detection technique, and then a dress region 430, a hair region 440 (excluding the face region 420), and a background region 450 (excluding the face region 420, the dress region 430, and the hair region 440) are respectively located according to the direction and size of the face region 420. The face locating technique adopted may be skin color detection or based on a kind of statistics algorithms, such as neural network or Adaboosting algorithm etc., from facial and non-facial samples.

In summary, in the present embodiment, different figures in a plurality of images are identified or distinguished according to the characteristics of the figures, and in order to increase the accuracy of figure identification, each of the images may also be normalized regarding the color, brightness, or contrast thereof before identifying the figures in the images. However, the identification process described above is only an example of the present invention but is not intended for restricting the scope of the present invention, and a user may select any figure identification method or condition according to the actual requirement without departing the spirit of the present invention.

It should be mentioned that in the present embodiment, an identity would be assigned to a figure of the image by recording the identity into a metadata corresponding to an image containing the figure. Furthermore, some relevant data of a figure, such as characteristic region and characteristics, are also recorded into the metadata. The metadata may be directly stored in a header file of the image, wherein the header file may be in International Press and Telecommunications Council (IPTC) format or exchangeable image file format (EXIF). Or, the metadata may be stored in an external file corresponding to the image, for example, a database or a file system, and the method for storing the metadata is not limited herein.

Additionally, there is an ambiguity of identity when a plurality of image groups are to be analyzed and have been assigned with identities respectively, for example, searching in an image collection including some images copied from a friend and the images have had identities in corresponding records. In the situation, identity of the same figure between image groups were different and present embodiment could correct the ambiguity by unifying the identities of the same figure for searching purpose. First, regional characteristics in the characteristic regions of each identity in an image group are extracted, and those figures having matched identity are searched. Then, by comparing the regional characteristics of each identity between different image groups, the identities having the same regional characteristic are considered as the same person and are reassigned with a unified label. In the case, an identity of an image group may have more than one image sample for comparison. Therefore, besides identity matching techniques of one sample problem mentioned above, a statistics algorithm, such as a neural network or a support vector machine (SVM), may also be adopted to recognize identity by learning of multiple images.

Figure 5:
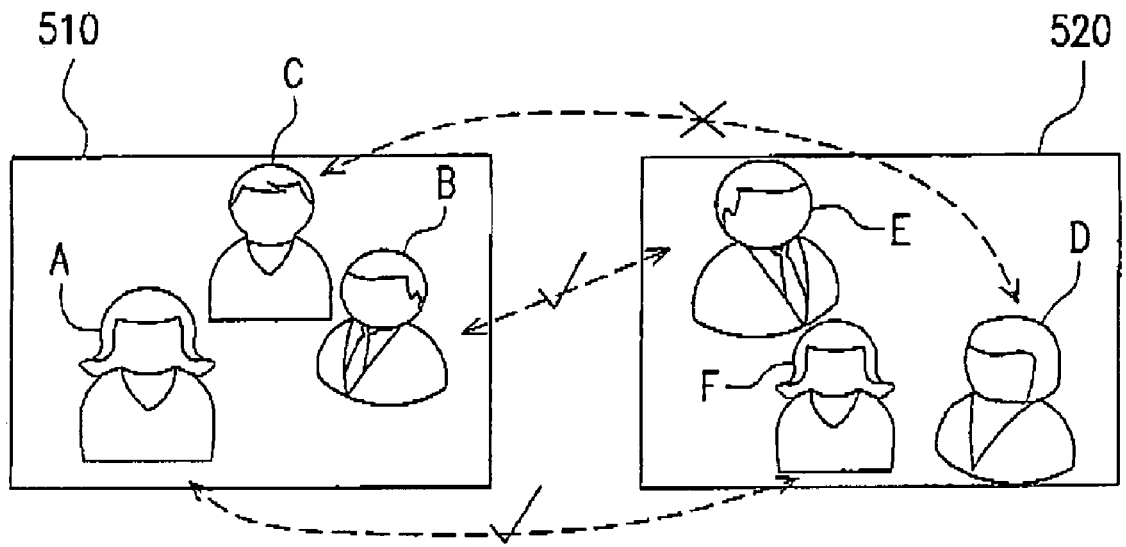
FIG. 5 illustrates an example of identity matching according to an embodiment of the present invention.
Figure 5:
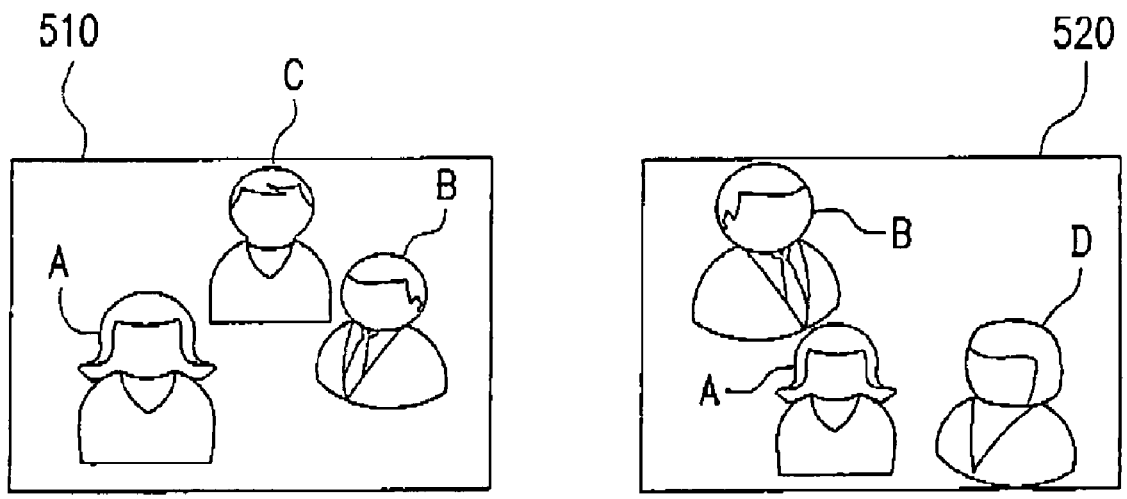

FIG. 5 illustrates an example of identity matching according to an embodiment of the present invention. Referring to FIG. 5(a) first, it is assumed that the image 510 and the image 520 belong to two different image groups, and the two image groups contain images taken at different time and have been assigned with identity respectively. Before the identities are unified, the identities of the figures in image 510 are respectively A, B, and C, and the identities of the figures in image 520 are respectively D, E, and F. The figures A and B in image 510 are respectively the same as the figures F and E in image 520. However, the figure C in image 510 and the figure D in image 520 are different. Here, the identities of the same figures in the two image groups are to be unified. Unlike the identity matching between two images described above, wherein only one regional characteristic is available for each figure, a plurality of regional characteristics belonging to the same identity in the same image group are fused to unify the identity between image groups. Referring to FIG. 5(b), after the identities are unified, the figure D in image 520 still has its original identity, while the original identities of the figures F and E in image 520 are changed to figures A and B respectively, so that the identity ambiguity in subsequent image searching is avoided.

After the figures are respectively assigned with identities, a representative image of each identity is evaluated (step S312). Through this step, a user can get to know all the figures in the image collection from the list of representative images and can directly use these representative images for searching figures. A representative index of every image for a identity is calculated according to the characteristic regions of the figure located previously and the image having the largest representative index from images of the same identity is selected as the representative image of the identity.

For example, the ratio of the face region in each image to the entire image is calculated and the image having the largest ratio is selected as the representative image of the identity. By selecting an image having the largest face region of a figure from a collection of images, user can recognize the looks of the figure clearly for subsequent definition of searching criterion. However, the user may also select any image for representing the figure in the image collection according to another representative index such as the size of a characteristic region, the number of appearance, and the capture time of the image, which is not limited by the present invention.

The image search stage is entered after the image analysis stage (step S320). First, representative images of figures are displayed on the screen (step S321) to be selected by the user. The representative images may be sorted according to the number of appearance of the corresponding identity before they are displayed. This is to arrange one figure appearing more frequently (more relative) in front of other FIGS. appearing less frequently (less relative) in a sequence so that user can usually access familiar figures more easily. However, the representative images may also be sorted according to the time when the figure is captured or the size of the representative image, which is not limited by the present invention.

Figure 6:
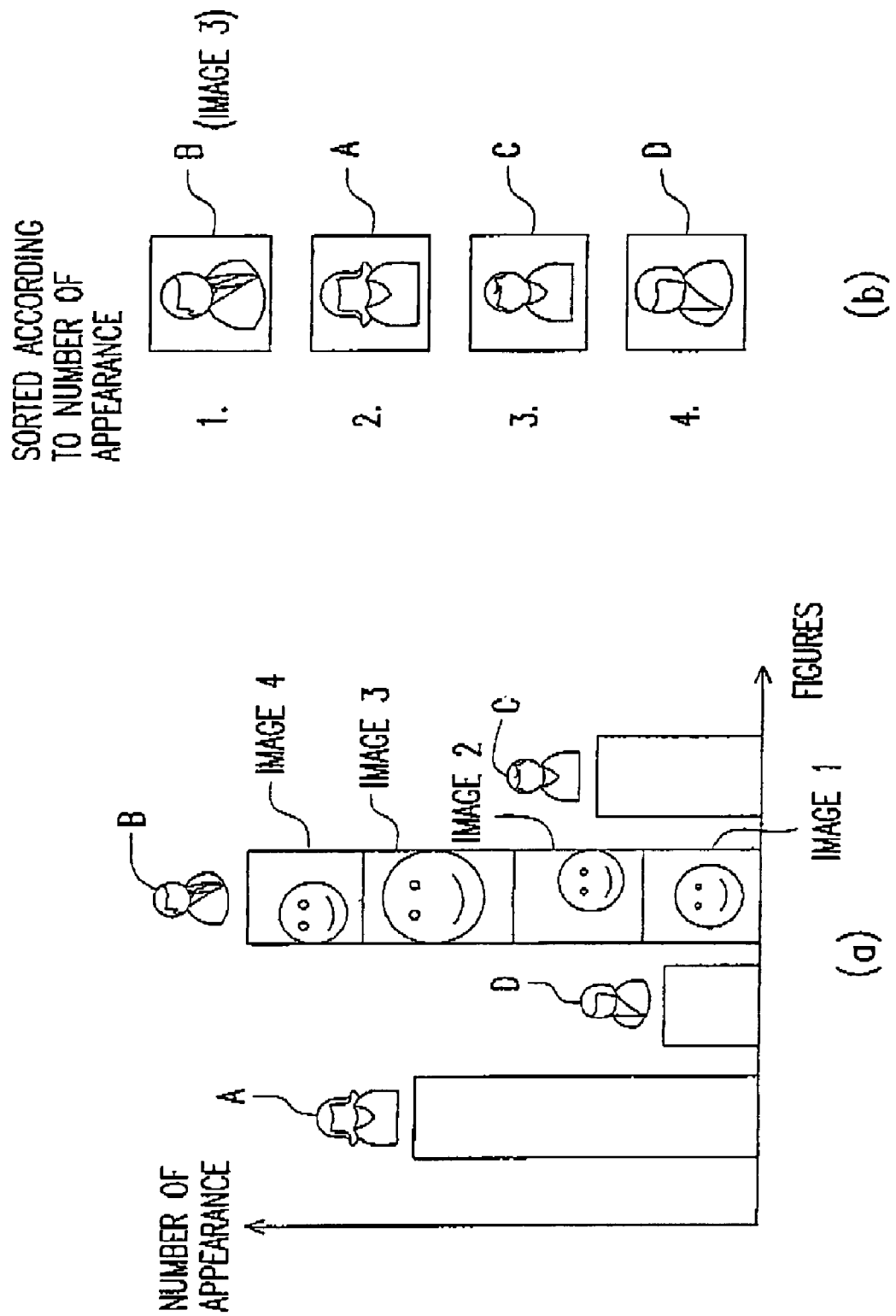
FIG. 6 illustrates an example of sorting representative images according to an embodiment of the present invention.

FIG. 6 illustrates an example of sorting representative images according to an embodiment of the present invention, wherein FIG. 6(a) illustrates the number of appearance of each identity in the image collection, and FIG. 6(b) illustrates the representative images sorted according to the number of appearance. As shown in FIG. 6(a), figure B appears the most times than others, thus, the representative image of figure B is put at the first place and is followed by figures A, C, and D in a sequence. 20 It should be mentioned here that the representative image of an identity may be images having the largest face region of the identity in the image collection. As shown in FIG. 6(a), in the images 1~4 of figure B, image 3 has the largest face region, thus, in FIG. 6(b), it is selected as the representative image of figure B.

Next, the user can select one or a plurality of representative images displayed on the screen as a searching criterion (step S322). In the present embodiment, user could drag and drop some representative images of desired figures into a search window as a searching criterion. The specified criterion is then translated in to corresponding identities for searching. The search interface of the embodiment evaluates representative images for user to select figures whom he/she is looking for, thus, compared to the conventional interface which shows labels tagged by user to every figures in the collection, the search interface in the present invention is simpler and more intuitive.

After defining the searching criterion, images matching the searching criterion in the image collection are obtained (step S323). As described above, in the present invention, the representative images specified are translated into corresponding identities, thus, the images matching the searching criterion can be found quickly by only comparing the identities recorded in the metadata of the images.

Finally, the result images are displayed on the screen (step S324). In the present embodiment, these images are sorted before they are displayed on the screen.

For example, result images can be sorted according to the number of figures in the image before they are displayed. If the user selects two representative images (for example, a couple) as a searching criterion, the result images may contain the two figures or more. In the case, suppose that images containing only the two figures are desired to the user. Thus, in the present embodiment, images are displayed in a descending order of figure number in the images so that it is more convenient for the user to pick up satisfying results. In addition, the result images may also be sorted according to the size of the face region in these images, which are not limited by the present invention.

Figure 7:
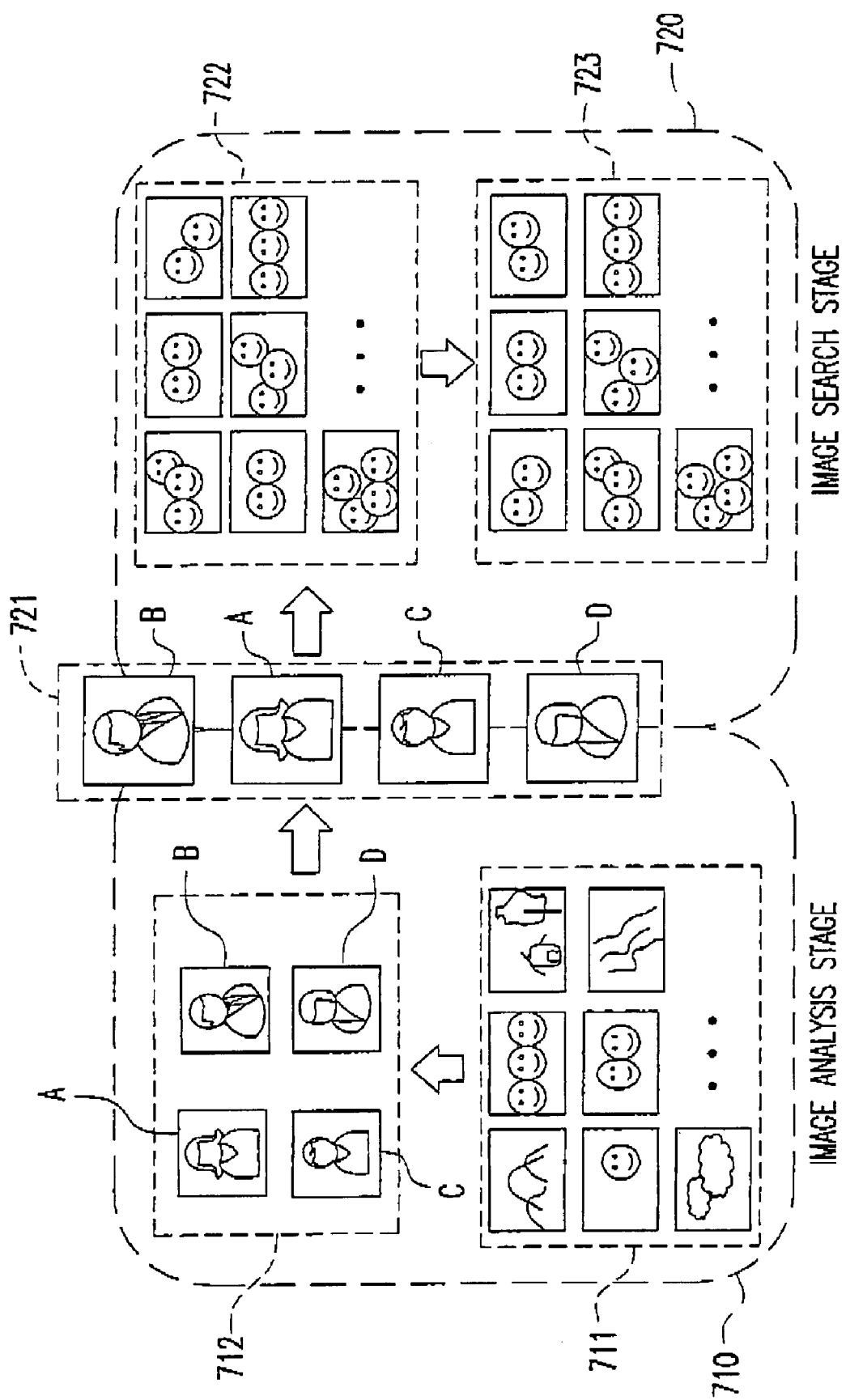
FIG. 7 illustrates an example of a method for searching images with figures according to an embodiment of the present invention.

FIG. 7 illustrates an example of a method for searching images with figures according to an embodiment of the present invention. Referring to FIG. 7, in the image analysis stage 710, a plurality of images in the image collection 711 are analyzed and a plurality of figures are identified automatically. Here it is assumed that there are four identities A, B, C, and D found in the image collection. Next, representative images of the four figures are evaluated from the image collection respectively, for example, portrait pictures of the four identities in the representative images 712. In the image search stage 720, the figures A, B, C, and D are sorted according to the number of appearance throughout the image collection, and the sorted representative images 721 are displayed. As shown in FIG. 7, the sorted representative images 721 form the portrait pictures of the figures B, A, C, and D in line. After that, two figures (for example, figure B and figure A) are selected from the representative images 721 as a searching criterion, and the result images 722 containing at least the two figures are found and displayed. Finally, the result images are sorted according to number of figures in the images and are displayed in the sorted result images 723. As shown in FIG. 7, the images displayed first contain only two figures and those images containing three or four figures are then displayed.

In summary, in the present embodiment, the figures appearing in the image collection are first analyzed and assigned with identities, so that in subsequent image searching process, those images matching the searching criterion can be found by comparison with identity. The search method described above in both the image analysis stage and the image search stage can be executed by computer software. Accordingly, both the time and effort for searching images with figures are reduced, and the convenience for searching images with figures is also increased.

Below, a system for implementing foregoing image search method according to an embodiment of the present invention will be described in detail.

Figures 8, 9:
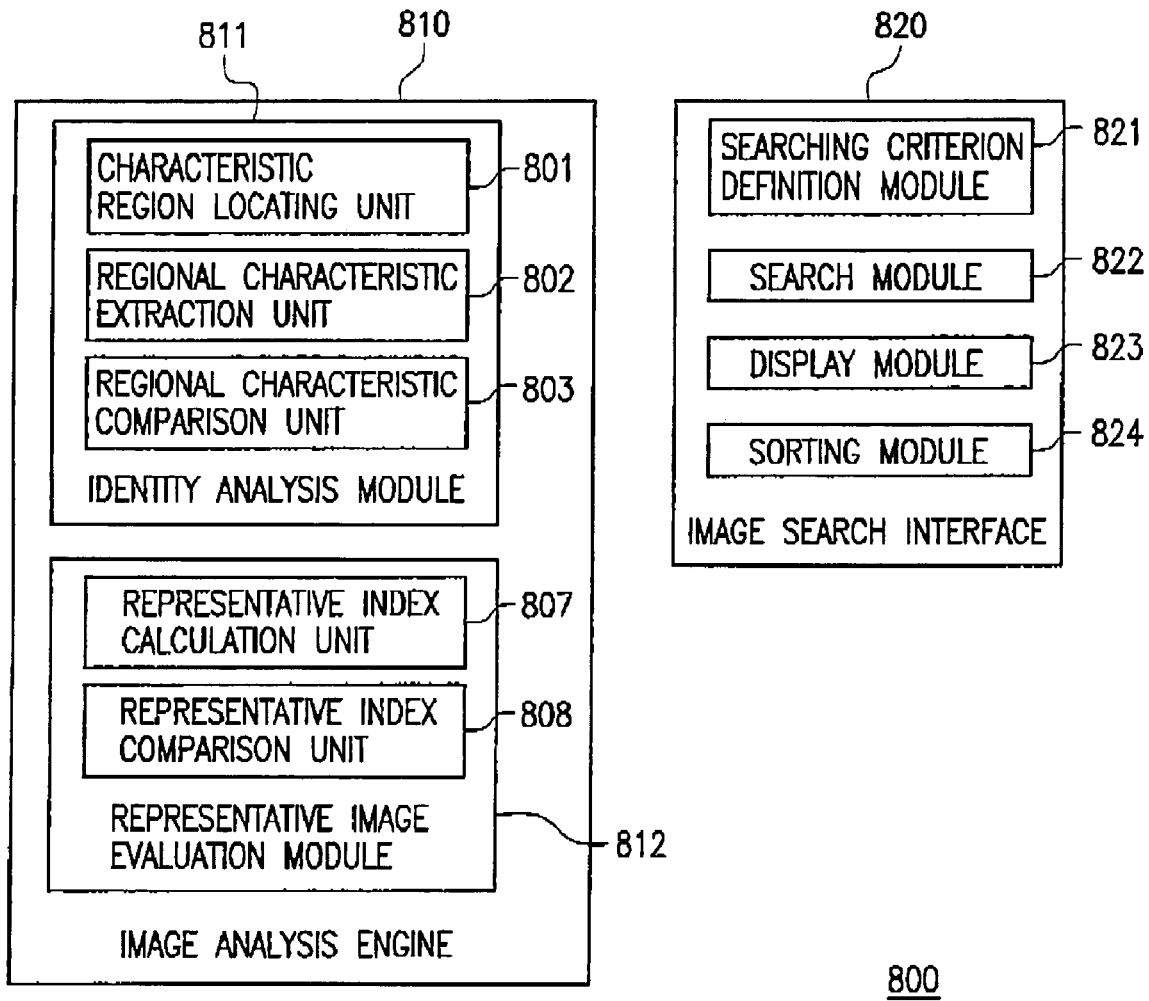
FIG. 8 is a block diagram of a system for searching images with figures according to an embodiment of the present invention.
FIG. 9 illustrates a metadata of an image according to an embodiment of the present invention.

FIG. 8 is a block diagram of a system for searching images with figures according to an embodiment of the present invention. Referring to FIG. 8, in the present embodiment, the search system 800 includes an image analysis engine 810 and an image searching interface 820.

The image analysis engine 810 assigns an identity to each of the figures in a plurality of images and selects a representative image for each identity, which realizes a hands-free tagging and a intuitive operation for user to search images. The image analysis engine 810 includes an identity analysis module 811 and a representative image evaluation module 812. The identity analysis module 811 matches a plurality of figures between in a plurality of images and respectively assigns a specific identity to each of the figures. In addition, the identity analysis module 811 also compares figures between a plurality of image groups and unifies the labels of the same identities. The identity analysis module 811 further includes a characteristic region locating unit 801, a regional characteristic extraction unit 802, and a regional characteristic comparison unit 803, and the functions of these modules will be respectively described below.

The characteristic region locating unit 801 locates the characteristic regions, such as a face region, a dress region, a hair region, and a background region etc., of each figure in the images. The regional characteristic extraction unit 802 captures regional characteristics of a figure in the characteristic regions. The regional characteristic comparison unit 803 compares the regional characteristic of each figure between images and assigns an identity to those figures having the same regional characteristic.

The image analysis engine 810 further includes a representative image evaluation module 812 to select the representative image of each identity in the image collection respectively. The representative image evaluation module 812 further includes a representative index calculation unit 807 and a representative index comparison unit 808. The representative index calculation unit 807 respectively calculates the representative index of every image for an identity depending on the average size of the characteristic region, the number of appearance of the identity, or the capture time of the image. The representative index comparison unit 808 selects the image having the largest representative index from images of the figure as the representative image of the identity in the image collection.

On the other hand, after analyzing figures and selecting representative images by the image analysis engine 810, images in the collection are searched through the image searching interface 820. The image searching interface 820 provides a simple user interface for the user to define a searching criterion and browse result images. The image searching interface 820 includes a searching criterion definition module 821, a search module 822, a display module 823, and a sorting module 824, and the functions of these modules will be respectively described below.

The searching criterion definition module 821 selects one or more of a plurality of representative images as the searching criterion. As described in foregoing embodiment, the searching criterion definition module 821 opens a search window and detects the representative images dragged and dropped into by the user. The representative images specified are then translated into corresponding identities which are used as the searching criterion.

Next, the search module 822 searches for images matching the searching criterion defined by the searching criterion definition module 821. The search module 822 may compare the identities in the searching criterion with the identities recorded in the metadata of each image in order to collect result images having the same identities.

The display module 823 displays the representative images and the result images. The representative images obtained by the representative image evaluation module 812 are sorted by the sorting module 824 according to the number of appearance of the identity, the average size of the characteristic regions, or the capture time of the image before they are displayed by the display module 823. In addition, the result images are also sorted by the sorting module 824 according to the number of figures or the size of characteristic region in the image before they are displayed by the display module 823.

The functions of various components in the search system 800 are corresponding to the various steps in foregoing embodiment, and the detailed implementations thereof are also the same as or similar to those in foregoing embodiment, therefore will not be described herein. Besides the system for searching images with figures, the present invention further provides a computer-readable recording medium for storing the metadata of figures in an image. Below, the recording medium provided by the present invention will be further described with reference to an embodiment of the present invention.

FIG. 9 illustrates a metadata of an image with a figure according to an embodiment of the present invention. Referring to FIG. 4 first, as described in foregoing embodiment, a face region 420 and other characteristic regions such as a dress region 430, a hair region 440 (excluding the face region. 420), and a background region 450 (excluding the face region 420, the dress region 430, and the hair region 440) are located in the image 400. Referring to FIG. 9, in the present embodiment, the metadata of an image with figures records a facial characteristic data of the figures in the image 400, such as the face regions of the figures, the characteristics of the faces, the proportions of the face regions to the entire image, and the number of figures in the image etc. Besides, the metadata also records regional characteristic data of other characteristic regions in the image, wherein the regional characteristic data may contains the representative color occupying the largest area in a characteristic region, the characteristic regions (for example, the dress region, the hair region, and the background region) and the regional characteristics. Referring to FIG. 8, the metadata mentioned above are generated by 801 and 802 and could provide necessary information to other unit, such as 803 for comparing characteristic, 807 for calculating representative index, and 824 for sorting images in a order.

Moreover, the metadata further records an identification data for maintaining the identities of figures in the corresponding image. The identification data may include identities of figures in the image and a random generated number for each metadata. By recording foregoing data in the metadata corresponding to the image, the identities can be provided to computer to collect images matching the user criterion and the random number can be checked by computer to resolve ambiguity of identity mentioned before.

In summary, the method and system for searching images with figures provided by the present invention have at least following advantages:

1. Figures in images are automatically analyzed through an image identification technique and are respectively assigned with an identity. Compared to the conventional method of tagging figures of images one by one, both the time and effort for image management are reduced in the present invention.
2. Representative images of each identity in the image collection are evaluated and sorted according to the social relationship thereof so that user can select one or a plurality of the representative images as a searching criterion. Compared to the conventional method which asks user to prepare name or sample image of the person, the invention offers an intuitive and easy way to search images.
3. Figures in different image groups taken at different time or by different devices are compared and the identities of the same figures in the image groups are unified. Accordingly, ambiguity of identity is avoided and the flexibility in the application of the present invention is increased.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for searching images with figures, suitable for searching a plurality of images related to at least one figure in an image collection, the method comprising:
   an image analysis stage, comprising:
      comparing figures between images of an image collection and respectively assigning an identity to each image of the image collection for each occurrence of an identified figure of the figures, the identity not derived mathematically from the pixel content of the image and relating to the identified figure; and
      selecting and associating a representative image in the image collection for each of the identities assigned; and
   an image search stage, comprising:
      displaying the representative images;
      selecting one or a plurality of the representative images as a searching criterion;
      searching for images matching the searching criterion in the image collection, the matching performed in dependence upon at least the identity associated with each selected representative image; and
   displaying the images matching the searching criterion.

2. The search method according to claim 1, wherein before comparing figures between images of an image collection and respectively assigning an identity to each of the figures, the search method further comprises:
normalizing one of the color, brightness, and contrast of the images of the image collection.

3. The search method according to claim 1, wherein the step of comparing figures between images of an image collection and respectively assigning an identity to each of the figures comprises:
locating a characteristic region of each of the figures in the images;
extracting a regional characteristic of each of the figures in each of the characteristic regions; and
comparing the regional characteristic of each of the figures between images, and assigning an identity to the figures having the same regional characteristic.

4. The search method according to claim 3, wherein the characteristic region comprises one of a face region, a dress region, a hair region, and a background region.

5. The search method according to claim 3, wherein the step of comparing figures between images of an image collection and respectively assigning an identity to each of the figures comprises:
collecting a plurality of image groups in which figures have been respectively assigned with identities;
extracting the regional characteristic of each of the identities in the characteristic regions of the image groups; and
comparing the regional characteristic of each of the identities between the plurality of image groups, and reassigning those identities having the same regional characteristic with a unified identity.

6. The search method according to claim 1, wherein the step of respectively selecting the representative image for each of the identities in the image collection comprises: respectively calculating a representative index of the identity in each of the images; and selecting the image having the largest representative index as the representative image of the identity in the image collection.

7. The search method according to claim 6, wherein the representative index comprises one of a size of the characteristic region, a number of appearances, and a capture time.

8. The search method according to claim 1, wherein the method for assigning the identity comprises recording the identity into a metadata corresponding to the image.

9. The search method according to claim 8, wherein the metadata is stored in a header file of the image or an external file corresponding to the image.

10. The search method according to claim 1, wherein the step of displaying the representative images comprises:
sorting the representative images according to a relationship index of each of the identities in the image collection; and
sequentially displaying the representative images.

11. The search method according to claim 10, wherein the relationship index comprises one of an average size of the characteristic regions, a number of appearances, and a capture time.

12. The search method according to claim 1, wherein the step of selecting one or a plurality of the representative images as the searching criterion comprises:
translating the selected representative images into the corresponding identities; and using the identities as the searching criterion.

13. The search method according to claim 1, wherein the step of displaying the images matching the searching criterion comprises:
sorting the images matching the searching criterion according to the number of the figures or the size of characteristic region; and
sequentially displaying the images matching the searching criterion.

14. The search method according to claim 1, wherein the method further comprises:
storing metadata of each image of the image collection in one or more non-transitory tangible computer-readable storage media, the metadata comprising:
a facial characteristic data recording a facial data of a figure in the image;
a regional characteristic data recording a regional data of a characteristic region other than the face region in the image; and
an identification data, recording the identity of a figure in the image and a random generated number.

15. The search method according to claim 14, wherein the facial characteristic data comprises data representing one of a face region, the size of the face region, the characteristic of the face region, and the number of figures in the image.

16. The search method according to claim 14, wherein the characteristic region other than the face region comprises one of a dress region, a hair region, and a background region.

17. The search method according to claim 14, wherein the regional characteristic data comprises data representing the characteristic region itself and data representing regional characteristic of the characteristic region.

18. A system for searching images with figures, comprising:
an image analysis engine, comprising:
an identity analysis module, comparing figures between images of an image collection and respectively assigning an identity to each image of the image collection for each occurrence of an identified figure of the figures, the identity not derived mathematically from the pixel content of the image and relating to the identified figure; and
a representative image evaluation module, selecting and associating a representative image in the image collection for each of the identities assigned; and
an image searching interface, comprising:
a searching criterion definition module, selecting one or a plurality of the representative images as a searching criterion;
a search module, searching for images matching the searching criterion in the image collection, the matching performed in dependence upon at least the identity associated with each selected representative image; and
a display module, displaying the representative images and the images matching the searching criterion.

19. The search system according to claim 18, wherein the identity analysis module further compares figures between image groups in which figures have been respectively assigned with identities and reassigns the identities of the same figures to a unified identity.

20. The search system according to claim 18, wherein the identity analysis module comprises:
a characteristic region locating unit, locating a plurality of characteristic regions of each of the figures in the images;
a regional characteristic extraction unit, extracting a regional characteristic of the figure in each of the characteristic regions; and
a regional characteristic comparison unit, comparing the regional characteristic of each of the figures in the images and assigning an identity to the figures having the same regional characteristic.

21. The search system according to claim 20, wherein the characteristic regions comprise one of a face region, a dress region, a hair region, and a background region.

22. The search system according to claim 18, wherein the representative image evaluation module comprises:
   a representative index calculation unit, respectively calculating a representative index for each of figures in images according to one of the size, the number of appearances, or the capture time of the figure; and
   a representative index comparison unit, selecting the image having the largest representative index from images of the identity as the representative image of the identity in the image collection.

23. The search system according to claim 18, wherein the identity assigned by the identity analysis module comprises being recorded in a metadata corresponding to the image.

24. The search system according to claim 23, wherein the metadata comprises being stored in a header file of the image or an external file corresponding to the image.

25. The search system according to claim 18, wherein the image searching interface further comprises:
   a sorting module, sorting the representative images according to the number of appearance, the region size, or the capture time of the corresponding identities, wherein the representative images are sequentially displayed by the display module.

26. The search system according to claim 25, wherein the sorting module further sorts the images of the image collection matching the searching criterion according to the number, the region size, or the capture time of figures, wherein the images matching the searching criterion are sequentially displayed by the display module.

* * * * *

UNITED STATES PATENT AND TRADEMARK OFFICE
CERTIFICATE OF CORRECTION

| | | |
|---|---|---|
| PATENT NO. | : 8,170,343 B2 | Page 1 of 1 |
| APPLICATION NO. | : 11/849294 | |
| DATED | : May 1, 2012 | |
| INVENTOR(S) | : Chien | |

It is certified that error appears in the above-identified patent and that said Letters Patent is hereby corrected as shown below:

On Title Page 2, in Item (56), under "OTHER PUBLICATIONS", in Column 2, Line 4, delete "pahes" and insert -- pages --, therefor.

In Column 7, Line 19, delete "sequence. 20" and insert -- sequence. --, therefor.

In Column 9, Line 55, delete "region." and insert -- region --, therefor.

Signed and Sealed this
Twenty-ninth Day of January, 2013

David J. Kappos
*Director of the United States Patent and Trademark Office*

UNITED STATES PATENT AND TRADEMARK OFFICE
CERTIFICATE OF CORRECTION

PATENT NO.      : 8,170,343 B2                                        Page 1 of 1
APPLICATION NO. : 11/849294
DATED           : May 1, 2012
INVENTOR(S)     : Chien It is certified that error appears in the above-identified patent and that said Letters Patent is hereby corrected as shown below:

IN THE DRAWINGS

Figure 2:
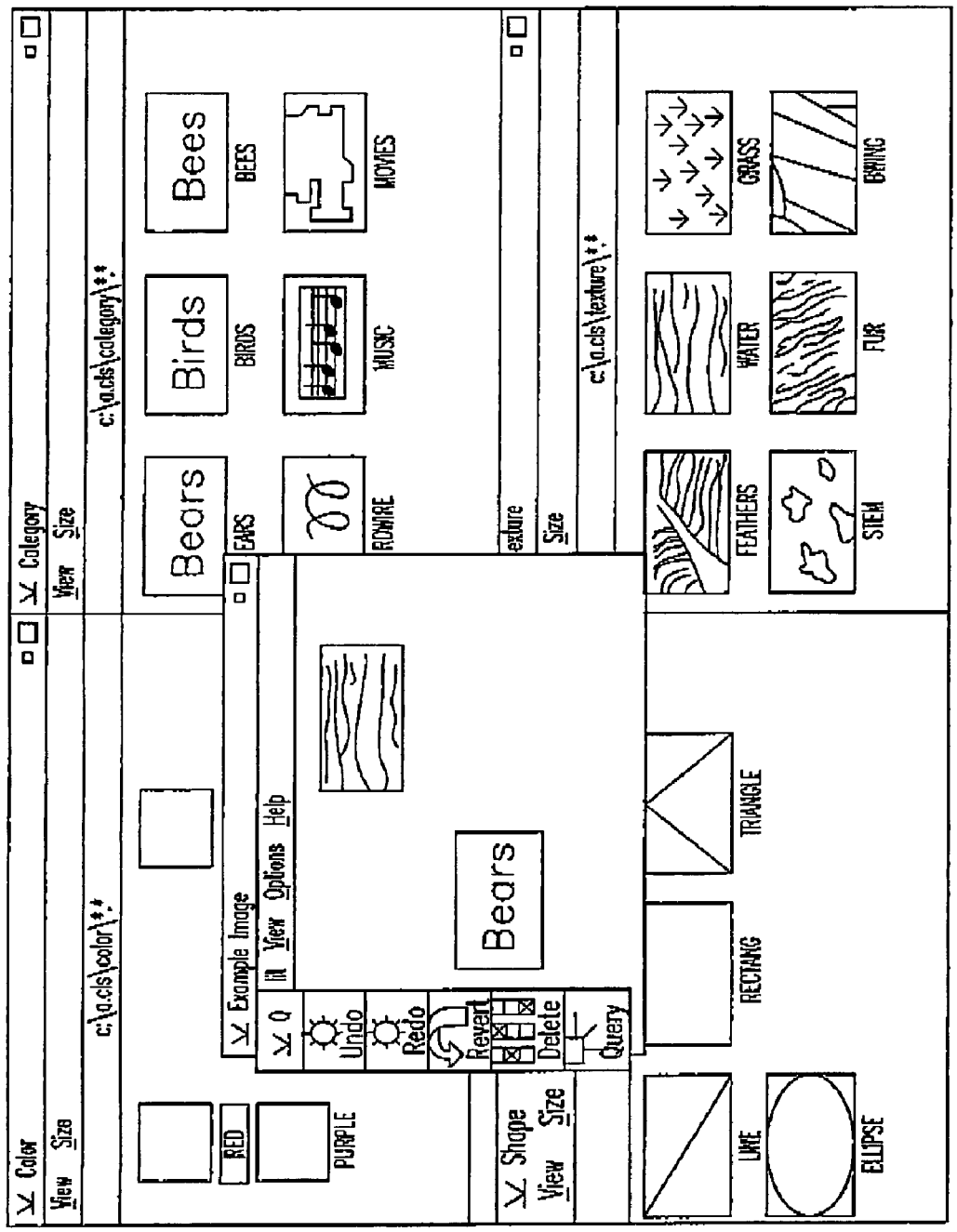
FIG. 2 illustrates an interface of a conventional image query system.

In Fig. 2, Sheet 2 of 8, delete "  " and insert -- 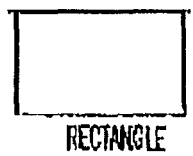 --, therefor.

In Fig. 8, Sheet 8 of 8, below Tag "811", delete "IDENTTTY ANALYSIS" and insert -- IDENTITY ANALYSIS --, therefor.

In Fig. 9, Sheet 8 of 8, delete "FIGURE IDENTTTY" and insert -- FIGURE IDENTITY --, therefor.

IN THE SPECIFICATION

In Column 4, Line 42, delete "DESCRIPTION" and insert -- DETAILED DESCRIPTION --, therefor.

In Column 7, Line 22, delete "1~4" and insert -- 1-4 --, therefor.

Signed and Sealed this
Sixteenth Day of April, 2013

Teresa Stanek Rea
*Acting Director of the United States Patent and Trademark Office*